Figure 1:
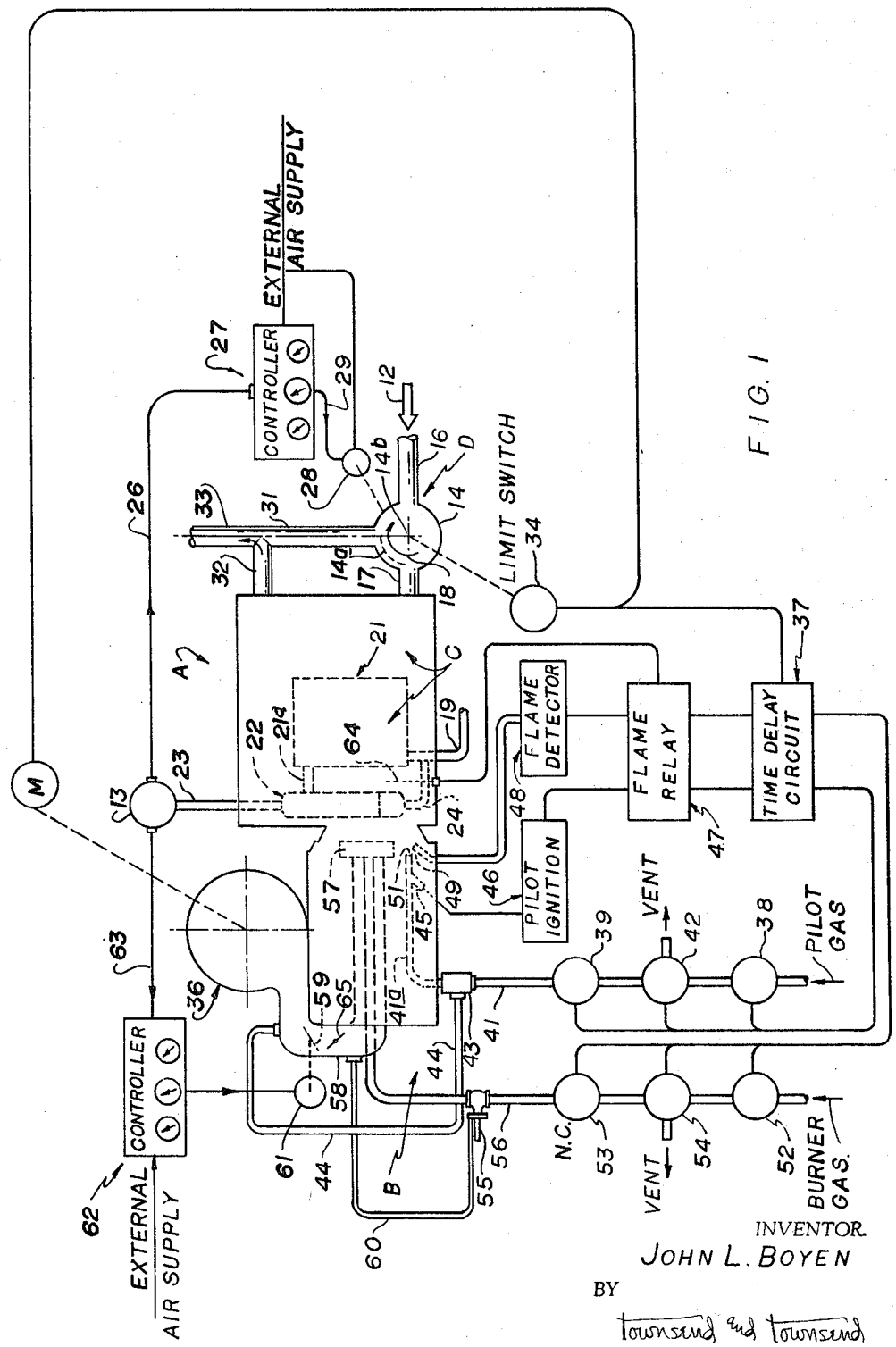

Jan. 31, 1967    J. L. BOYEN    3,301,223
AUXILIARY FIRING SYSTEM
Filed July 21, 1965    2 Sheets-Sheet 2

INVENTOR.
JOHN L. BOYEN
BY
Townsend and Townsend
ATTORNEYS ical energy, new techniques have been sought to utilize the waste heat gases of such turbines. Failure to utilize such waste heat represents a total loss in overall plant efficiency and an economic burden in the initial establishment and operation of such plant.

United States Patent Office 3,301,223
Patented Jan. 31, 1967

3,301,223
AUXILIARY FIRING SYSTEM
John L. Boyen, Oakland, Calif., assignor to Besler Corporation, Emeryville, Calif.
Filed July 21, 1965, Ser. No. 473,722
6 Claims. (Cl. 122—7)

This invention relates to improvements in waste heat recovery boilers and more particularly to a novel system and apparatus that provides for auxiliary heat when the waste heat source is below that required, or ceases altogether, during a specific boiler output demand.

In recent years, particularly with the advent of commercial gas turbines used as prime moves for the generation of electrical energy, new techniques have been sought to utilize the waste heat gases of such turbines. Failure to utilize such waste heat represents a total loss in overall plant efficiency and an economic burden in the initial establishment and operation of such plant.

One of the problems facing the designer in the utilization of ordinary commercial waste heat gases is that the source of such heat, such as the gas turbine, often fluctuates in its required operation and at times may not be required to operate at all. Hence in the design of systems for the recovery of such waste heat allowance must be made and equiment provided to augment the waste heat source in order to maintain reliable overall plant operation.

Ordinarily waste heat is utilized in a so-called waste heat recovery boiler which may generate steam for heating, air conditioning, and industrial processes appropriate to a given plant installation. A constant heat source is often required by the demand imposed upon such heat recovery boilers even when the tail gases or other waste heat sources fluctuate. In order to accomplish this, the prior art which I am familiar generally utilizes the waste heat gas as a preheated combustion air source with which to fire additional fuel. Thus an external fuel supply is normally required even during periods when the waste heat gas alone is sufficient to produce the desired hot working fluid output.

The disadvantages inherent in the aforementioned prior art systems may be overcome generally by the direct use of waste heat gases in a heat exchanger section of a steam generator or boiler. Such a direct waste heat recovery unit is shown and explained more fully in my copending patent application entitled "Total Energy Conservation System," Serial No. 419,615, filed December 18, 1964. However, even in my novel improved type of waste heat recovery system, there may arise the need to maintain a predetermined level of hot gas into the unit during periods of steam demand when the source of waste heat gas may be relatively low or cease altogether.

Another problem sometimes encountered in waste heat recovery units is that the amount of heat or temperature of a particular waste heat source even at its maximum level may not be sufficient to generate the heat required within the heat transfer chamber. Under such circumstances means may be required to augment or boost the hot gas flow to achieve the proper operating temperature and heat flow.

Thus it is an object of this invention to provide a waste heat recovery boiler which normally uses hot waste gases directly without burning other fuel, and including a heat transfer chamber and heat exchanger, with an auxiliary heating unit mounted on the outside of the unit to provide an auxiliary source of hot gas flow in the event the waste heat source falls below a predetermined level or ceases altogether during a specific boiler output demand period.

It is also an object of this invention to provide a temperature or pressure sensing system with the auxiliary heating unit responsive to the temperature or pressure of hot fluid output from the heat recovery unit. The temperature or pressure sensing system in turn controls the flow of auxiliary heat introduced into the heat recovery unit in reciprocal relation to the pressure or temperature of the working fluid produced at the output of the heat recovery unit.

It is a more specific object of this invention to provide an auxiliary heater for a waste heat recovery unit including an external cylindrical shell which houses the auxiliary heating unit and which may be attached to a heat recovery system with minimum alterations to the unit itself. The auxiliary heating unit includes a conventional gas or other suitable fuel burner responsive to the aforementioned sensing means which causes the burner to commence firing after a preselected period of a reduced level of waste heat flow into the unit.

It is further a object of this invention to provide an auxiliary heating unit of the type described above including an internal concentric coaxial cylindrical member which protrudes into the heat transfer chamber of the heat recovery unit and which, with the outer cylindrical shell, forms a plenum in the annular space between the inner cylindrical member and the outer cylinrrical shell. The inner cylindrical shell has formed therethrough a plurality of apertures to provide fluid communication between the plenum and the inner portion of the auxiliary heating unit. Such fluid communicating apertures may provide for the passage of diluent air from a discharge blower into the tip of the inner cylindrical member and heat transfer chamber to control the combustion and temperature level of the auxiliary firing unit.

Other objects, features and advantages of the invention will become apparent from a reading of the specification which follows and referring to the accompanying drawings in which similar characters of reference refer to corresponding parts in the several views.

Turning now to the drawings, FIG. 1 is a flow diagram partly in schematic and partly in block form showing my novel system and apparatus.

Figure 2:
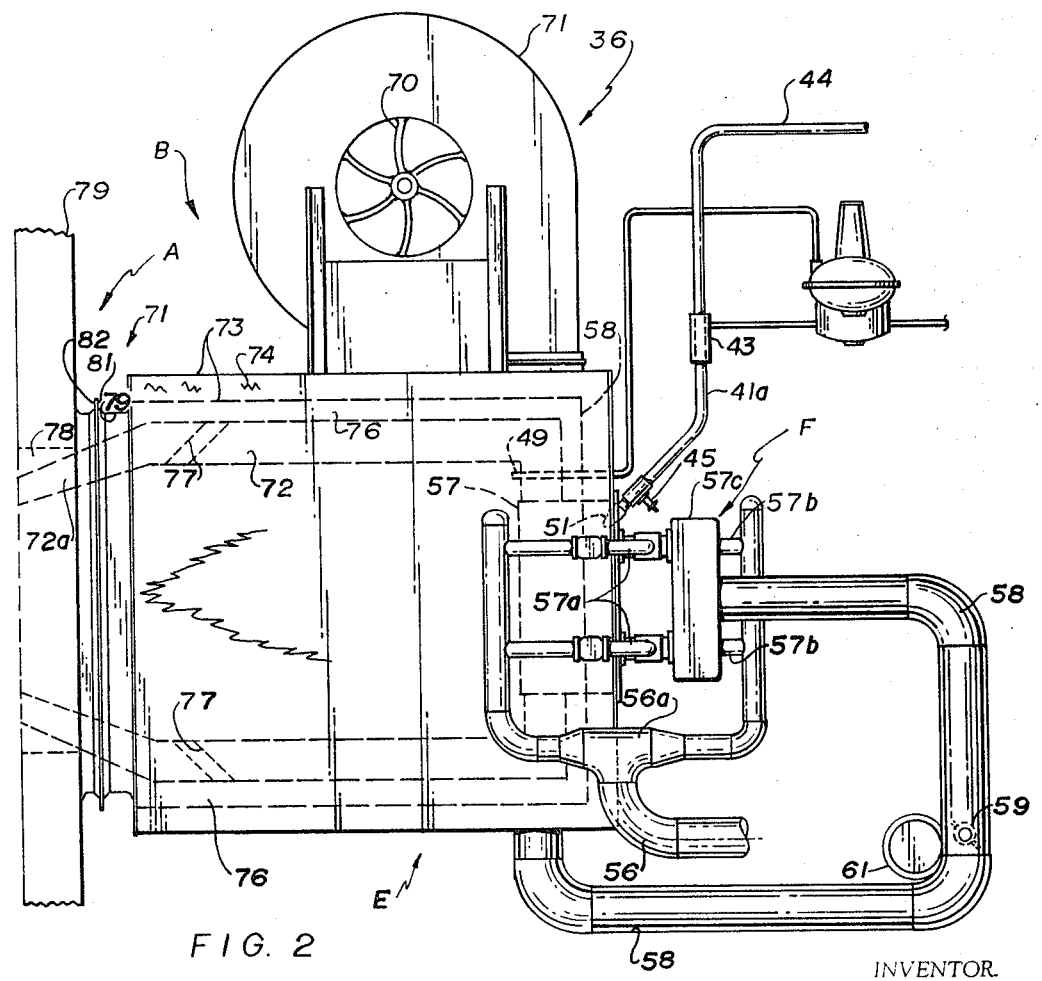

FIG. 2 is a more detailed view of one portion of my invention including its novel auxiliary burner assembly.

This invention embodies a system and apparatus as shown in FIG. 1 to provide auxiliary heat to a waste heat recovery boiler at A when the flow from an external source of waste heat gas indicated by arrow 12, and normally conveyed into the boiler at C, drops below a certain predetermined value, or ceases altogether, during a specific boiler output demand period. More specifically, auxiliary heat may be injected into the boiler by means of hot gas produced by the novel auxiliary burner indicated at B. The controlling variable of this novel system may be either the temperature or pressure of steam or other hot fluid at outlet header 13. As the demand for output fluid varies the temperature or pressure at the output header, a portion of such variation is transmitted to the pilot regulator at 27 which in turn controls the setting of the gas flow modulator valve at D and hence the amount of waste heat introduced into the heat recovery unit from the external source. Accordingly the boiler output is regulated in accordance with the amount of hot fluid being consumed and taken from the output header.

When the demand for steam or other hot fluid at boiler outlet header 13 exceeds the amount of hot fluid may be produced by the waste heat of the gas being conveyed through the gas flow modulator valve, even in its fully opened position, then, and only then, the novel auxiliary burner at B may be energized. When energized, the auxiliary burner augments, or in some instances provides entirely, hot gas to maintain the pressure or temperature of the hot fluid at the output header. Moreover, the auxiliary burner shown at B produces or augments the flow of waste heat gas with hot gas having substantially the same properties as the waste heat gas from the external source would have had had its flow remained or have been sufficient to maintain the hot fluid output demand.

Although reference is made throughout this specification to certain specific components, e.g., the gas flow modulator valve at D which is of a novel rotating curved plate type as shown in my copending patent application for "Hot Gas Modulating Valve," Serial Number 451,914, filed April 29, 1965, a conventional butterfly damper valve may be used in its place. Similarly, other components may be substituted for those shown and described herein without altering the invention.

The heat recovery unit indicated generally at A in FIG. 1 may be any type of a number of such units generally known in the art but I prefer the use of this invention with my novel waste heat recovery unit as shown in my aforementioned copending application, Serial Number 419,615, wherein a source of feed water is conveyed through line 19 from a conventional feed water pump, a well-known device not described herein nor shown on the drawings. Internally the feed water may be conveyed through a water tube coil arrangement such as that indicated at 21 which is exposed to the incoming waste heat gases whereby hot fluid such as steam may be generated in accordance with known engineering principles, conveyed through conduit 21a into a steam separator as indicated at 22, and then discharged through output line 23 to outlet steam header 13. The separated hot water is returned through return line 24 to the feed water circuit for recirculation through the unit. For a more complete description of a heat recovery system, reference may be made to my aforementioned copending U.S. patent application, "Total Energy Conservation System," Serial No. 419,615, filed December 18, 1964.

If demand for steam, or other hot fluid, taken from the system at outlet header 13 increases, fluid or steam pressure therein, and in sensing line 26, is caused to decrease. Line 26 is connected in fluid communication with the Bourdon tube of the pneumatic pressure pilot or controller indicated generally at 27, which may be of the type shown and explained in the U.S. Patent No. 2,770,247 to Huston. The decrease in the Bourdon tube pressure of controller 27 causes an increase in the output air pressure thereof which is communicated through line 29 to pneumatic actuator 28. Actuator 28 in turn is mechanically coupled to shaft 14b which rotatably supports curved plate 14a of the hot gas modulator indicated at D. When the pressure in line 29 increases, actuator 28 causes curved plate 14a to be rotated in the direction of arrow 18 thereby causing additional waste heat gas to be conveyed into the heat recovery unit. At the same time, the modulator plate blocks off more of gas bypass conduit 31, and less waste heat gas is conveyed upwardly through the bypass conduit for confluence with the heat recovery unit exhaust in conduit 32 and eventual expulsion upwardly through conduit 33 to a conventional stack (not shown) and hence to the atmosphere. Similarly, if the steam demand remains constant, but the amount of waste heat from the external source either ceases or drops below a certain predetermined level, the amount of steam generated and the pressure at output header B will tend to drop. Such drop in pressure at the output header will cause the controller at 27 to urge actuator 28 to rotate curved plate 14a in the direction of arrow 18; and additonal waste heat gas, if available, will be conveyed to the heat transfer chamber at C to increase the boiler's hot fluid output.

Curved plate shaft 14b is mechanically coupled to limit switch 34. Thus, when the curved plate is rotated in the direction of arrow 18 completely opening the valve to the heat recovery unit at A, and completely closing off bypass conduit 31, the limit switch closes a conventional circuit which energizes blower motor M and the blower indicated at 36 which conveys primary air through conduit 58 into the auxiliary firing unit indicated generally at B. Simultaneously, limit switch 34 also energizes a conventional electrical time delay relay and associated circuitry indicated at 37; during the time delay period, blower 36 purges any gas that may be present in the auxiliary firing unit. After the time delay relay period elapses, and if the demand for additional steam or hot fluid persists at header 13, the time delay circuit completes the pilot circuit which energizes normally closed, solenoid actuated valves 38 and 39 in pilot gas line 41 to the open position; and normally open pilot vent valve 42 is closed, causing pilot gas to be conveyed into mixing chamber 43 which is also supplied with air from the blower at 36 by means of air line 44. The combustible mixture of pilot gas and air is then conveyed from mixer 43 through pilot gas line extension 41a past a conventional spark igniter 45 which is electrically actuated by the pilot ignition circuit indicated generally at 46. The pilot ignition circuit in turn is energized for a predetermined time interval, for example approximately 15 seconds, by a conventional flame relay indicated at 47 and the aforementioned time delay circuit after the initial time delay relay period. The flame relay circuit is also interconnected with the detector circuit indicated at 48 whose sensing element 49 is positioned within the auxiliary burner assembly in the immediate vicinity of the outlet of burner 57. When the main burner gas and combustion air mixture are conveyed by the burner at 57 toward the water tube chamber indicated at 21, as will be explained in greater detail hereinafter, the conveyed mixture is ignited by the pilot flame emitted by pilot flame ejector 51. If for any reason ignition of the pilot flame fails, and/or the main burner gas mixture is not ignited within the time interval that the pilot igniter is activated, flame detector 49, in conjunction with the flame detector circuit indicated at 48, causes the flame relay circuit at 47 to shut down both the pilot gas source and the main burner gas by deactuating normally closed valves 39 and 53, respectively. When this occurs, a warning light, alarm buzzer, or the like, may be actuated to alert maintenance personnel to investigate the malfunctioning portion of the system. The specific structure of time delay circuit 37, spark igniter 45, ignition circuit 46, flame relay 47, detector circuit 48, and sensing element 49 are well-known expedients to those skilled in the art and hence are not described herein nor shown on the accompanying drawings in any great detail.

In addition to the description of the main burner gas supply set forth above, the following should be noted. After the aforementioned time delay period, the time delay circuit at 37 causes the flame relay circuit at 47 to energize normally closed, solenoid actuated, main burner gas valves 52 and 53 and normally open main gas vent valve 54. As a result, the main gas supply is conveyed through line 56 toward main gas regulator valve 55.

A small portion of pressurized air generated by the blower at 36 in duct 58 is tapped off downstream from butterfly damper 59 and conveyed by means of regulator air line 60 to conventional gas regulator 55. The degree to which regulator 55 permits passage of main burner gas is a function of the amount of air pressure that is exerted on the regulator through line 60 and achieves such regulation in a manner known to those having ordinary skill in the art. The air pressure in line 60, in turn, is controlled by the setting of damper 59 which is mechanically coupled to pneumatic actuator 61 which in turn is controlled by the pressure of air emitted from a second pneumatic pressure pilot or controller at 62 which is similar in all respects to the unit shown at 27 and also responsive to the pressure or temperature at outlet header 13. Hence, if pressure demand at the header varies and the hot fluid pressure therein declines to and remains at a lower than predetermined value, damper 59 is caused to move in the direction of arrow 65; and actuation air pressure is conveyed through line 60 to cause regulator valve 55 to permit flow of gas through line 56 to burner 57 in an amount proportional to the open position of damper 59.

It should be noted that pneumatic controllers 27 and 62 are to the type which may be equipped with what is termed in the instrumentation art as reset action combined with a proportioning band control, and such features are explained in greater detail, for example, in the aforementioned U.S. Patent No. 2,770,247 to Huston. As utilized in my invention these operating features of the pneumatic controller at 62 provides that, when the auxiliary burner at B is first caused to begin operation as described above, including the various electrical circuits and components, the feed back or low pressure signal in line 63 from header 13 causes controller 62 to energize pneumatic actuator 61 by an amount which opens damper 59, and hence regulator 55, by a relatively small predetermined amount at the low side setting of the proportional band controller adjustment. If low pressure in line 63 persists, i.e. if the demand at header 13 continues and the normal source of waste heat gas remains below the predetermined level, controller 62 automatically resets itself in a manner explained in the aforementioned U.S. Patent No. 2,770,-247, at column 4, and energizes actuator 61 an additional incremental amount, thereby causing the flow of air and fuel to burner 57 to increase by a predetermined, finite, nominal amount. Such incremental steps are repeated until the pressure, or temperature, of hot fluid output at header 13 reaches the high side proportional band adjustment setting of controller 62; thus the auxiliary fuel burner at B is brouhgt to operating equilibrium condition in a gradual and continuous manner which avoids excessively high hot gas temperatures that could be caused by a sudden burst of burner fuel and air. At the same time, the feedback variable or sensing pressure in line 63 may limit the amount of auxiliary firing in the event some waste heat gas is conveyed through conduits 16 and 17 into the heat transfer chamber at C thereby contributing heat to the system for the generation of hot fluid temperature or pressure at header 13. If the gas temperature within C exceeds a certain safe level, as determined by the boiler design itself, exhaust gas high limit sensing device 64, of a type known in the art, operates to cause the flame relay circuit at 47 to discontinue the main burner gas supply by deactuating solenoid operated valves 52 and 53 and venting through valve 54.

Other conventional safety features are also incorporated in the fuel and air supply system described above; these include automatic shut-down of the system in the event of excess main burner gas pressure, failure of pilot or main burner gas, or loss of supply air. Such conventional safety features are well-known expedients and are not detailed on the accompanying drawing nor described herein since their incorporation into the system shown would be obvious to one having ordinary skill in the art.

It should be noted that the pneumatic controller indicated at 27 is adjusted to completely open the gas flow modulator at D at or below a predetermined outlet steam header pressure, for example at or below 15 lbs. per square inch, thereby causing all the waste heat gas to be conveyed into the heat recovery unit. The controller indicated at 62, however, is normally set to cause actuation of damper 59, and hence air and fuel to be conveyed to burner 57, when the steam header pressure in line 63 drops to a value lower than the low sensing pressure indicated to the gas modulator actuator. For example, if the controller at 27 is set to commence and continue opening of the gas flow modulator valve at D when the output header pressure drops to and persists at 15 lbs. per square inch, the controller indicated at 62 may be set to cause movement of damper 59 when the steam header pressure drops to and persists at about 12 lbs. per square inch. In this manner the auxiliary burner unit does not sporadically fire into the heat recovery unit when the waste heat gas source merely fluctuates momentarily while generally maintaining just the minimum flow needed to support a given outlet steam header pressure, for example not less than 15 lbs. per square inch. On the other hand, the upper sensing pressure range of controller 62 may be set to overlap with that of controller 27 to assure continuous equilibrium operation of the heat recovery unit after auxiliary firing is commenced. Once, however, sufficient waste heat becomes available and is restored to the system, high temperature gas limit sensing device 64 and normal operation of controller 27 and limit switch 34 should cause shut down of the auxiliary firing system.

In the operation of my system as described above, auxiliary firing is controlled as a function of the hot fluid output demand and the availability of waste heat gas from an external source. As will be explained below, the type of auxiliary heat that is introduced into the system by my invention is the product of a completely separate and independent combustion system as distinguished from prior art devices which merely add fuel to a decreased, albeit oxygen rich, waste heat gas. Thus the auxiliary heat gas flow of my invention does not rely for its combustion on waste heat gases which, when auxiliary firing becomes necessary, may be completely on the wane or at best unpredictable as to flow rate. As mentioned above, the auxiliary gas temperature is limited by exhaust gas high limit sensing device 64 and, in some instances, by the use of diluent air as shall be explained below in reference to the novel structure of my anxiliary burner assembly. Accordingly, the auxiliary heat gases that are introduced into the heat transfer chamber of the recovery unit at C, either separately or in combination with an external source of waste heat gas, are caused to maintain thermodynamic properties substantially the same as the waste heat gas alone would have had had the latter remained available in sufficient amount to maintain the necessary output header hot fluid temperature or pressure.

Reference is now made to FIG. 2 which shows in greater detail the auxiliary burner assembly indicated at B in FIG. 1. The assembly fundamentaly comprises three portions; namely, the burner barrel indicated generally at E, the fuel supply and burner assembly at F, and the blower and air apparatus shown at 36.

In addition to earlier references made to the auxiliary burner assembly and FIG. 1, the air blower assembly at 36 comprises blower housing 71 within which there is a conventionally mounted centrifugal blower 70 which, upon being rotated by the blower motor indicated in FIG. 1, conveys air through duct 58. Duct 58 communicates to a conduit section housing butterfly valve 59 whose position in turn is controlled by pneumatic actuator 61 whose operation has been explained in greater detail hereinabove. The combustion air is then further conveyed into the burner assembly indicated at F where it is mixed with fuel and fired into combustion cylinder 72.

The burner assembly at F is of a conventional form known to those skilled in the art and is provided with fuel from main burner line 56 which divides into two branches at T56a for further distribution at pipe manifolds 57a and 57b which lead into the gas burner mixing chamber 57c and thence to the burner ejector 57 within the combustion barrel indicated generally at E.

The burner barrel at E in FIG. 2 comprises an inner combustion cylinder 72, which may be fabricated from appropriate ceramic material or the like, surrounded by a suitable sheet metal housing having double walls 73 between which there is disposed insulation material 74 such as rock wool, fibre glass, asbestos, or the like. The inside diameter of inner housing wall 73 is somewhat greater than the outside diameter of the straight portion of combustion cylinder 72 thereby forming plenum 76 between the cylinder and the inside surface of inner housing wall 73. A series of draft passageways 77 form a path for fluid communication between plenum 76 and that portion of cylinder 72 which is near to its forward, frusto-conical section 72a. The function of passageways 77 is to introduce a flow of diluent air into the combustion cylinder in the direction of flame propagation therethrough as further explained below. Burner cylinder 72 is closed at one end forming circular disc portion 72b through which burner ejector 57 and flame sensing device 49 protrude and from which they are supported; the other end of burner cylinder 72 is shaped to form frusto-conical portion 72a which protrudes outwardly from the portion of the burner cylinder surrounded by housing walls 73. The entire auxiliary burner assembly may be mounted for firing into a heat recovery unit indicated at A by means of the arrangement shown generally at 71. When so mounted in operable position in a heat recovery unit, the forwardly tip end or small diameter portion of frustoconical section 72a faces into the combustion chamber at C (FIG. 1) through opening 78 in wall 79 of the heat recovery unit as shown in FIG. 2.

Housing walls 73 in the region surrounding the large end of frusto-conical section 72a may be decreased in diameter to form necked portion 79 having integral flange 81. Flange 81 may be formed to have an outside diameter equal to that of mating flange 82 which is integral with, and protrudes outwardly from, wall 79 and defines an opening concentric with opening 78 in said wall which receives the small diameter end of frusto-conical portion 72a. Flange portions 81 and 82, which may be made of sheet steel or other suitable material, are joined in a relatively gastight connection as by bolting or the like, to combine integrally the auxiliary burner unit indicated at B with the heat recovery unit at A. Conventional support struts or other apporpriate structure as necessary may be added to support the auxiliary burner assembly in its operating position; such expedients are well-known to those skilled in the art and are not shown on the accompanying drawing or described in greater detail herein.

As explained and described above, my novel auxiliary burner unit may be made to respond to a predetermined level of hot fluid output pressure or temperature at header 13 in order to augment the waste heat gases being conveyed into the heat recovery unit from an external source and maintain a given predetermined hot fluid output pressure or temperature. This type of auxiliary firing may be referred to as supplementary firing. It is understood, however, that such a system may be adapted to provide auxiliary firing in order to increase the hot gas temperature and/or the flow of hot gas in the region of heat transfer chamber C to a temperature and/or a flow rate generally greater than that available from the external waste heat source. This may be required to obtain output fluid temperatures or pressures greater than those ordinarily available using a particular waste heat gas source and yet be within the heat recovery capability of the unit. When the system is adapted for this type of service, the auxiliary firing may be referred to as booster firing. Under these circumstances it is sometimes necessary to provide additional air, sometimes referred to as diluent air, into the hot gas path flow in the combustion cylinder near the tip of the auxiliary gas combustion flame in order to maintain predetermined gas temperature levels. In such case a certain amount of air from the blower indicated at 36 may be diverted by conventional means, not shown on the drawing nor described herein, and conveyed into plenum 76 and thence through passages 77. In some instances an additional blower may be added to the system to provide diluent air if the diluent air demand is greater than that which can be supplied from the primary blower alone.

It is also understood that my auxiliary burner, unlike many of the prior art devices which rely upon the presence of a certain minimum amount of waste heat gas to provide combustion air, may be used to provide all of the heat for the heat recovery unit when no hot waste heat gases are available from an external source. Such auxiliary firing may be referred to as total firing. In this manner my invention has a decided advantage over prior art heat recovery units with which I am familier in being able to maintain a source of hot fluid output from the heat recovery unit even when the external source of waste heat gas, such as a gas turbine, is not operating.

It should also be noted that my auxiliary burner indicated at B is of a uniquely modular design which may be added to a heat recovery boiler unit either at the time of initial design and manufacture or even after the unit has been installed in the field without involving extraordinary field fabrication. The entire auxiliary burner unit itself may be shop fabricated and shipped to the field where the field installation may be made relatively easily. It should also be evident that my auxiliary burner is not only modular in concept but may be installed with relative ease in a number of different positions about the periphery of the heat recovery unit casing depending upon the particular geometry and space limitations of a given installation.

Although I have described my invention herein, and with reference to the accompanying drawings, in respect to a specific installation, it is understood that a number of mechanical modifications may be made thereto within the spirit of my invention and scope of the appended claims.

What is claimed is:

1. In a waste heat recovery unit of the type having a heat transfer chamber, a heat exchanger mounted within said chamber, means applying working fluid to said heat exchanger for conversion of said fluid to a hot pressurized fluid, the improvement of an auxiliary firing system comprising in combination: means to import a waste heat gas from a source thereof into said chamber for interaction with said heat exchanger; indicator means sensitive to the energy level of pressurized fluid released from said heat exchanger; valve means responsive to be controlled by said indicator means to vary the input of waste heat gas to said heat transfer chamber inversely in respect to the energy level of said pressurized fluid; heating means mounted outside said heat transfer chamber and opening into said heat exchanger; means mounted in said heating means to generate hot gas for flow to said heat exchanger; actuator means responsive to be controlled by said indicator means at and below a predetermined energy level of said pressurized fluid, said actuator means arranged to vary the rate of hot gas flow created by said heating energy level of said pressurized fluid at and below said predetermined energy level; a cylindrical shell mounted on one external surface of said heat recovery unit with the longitudinal axis of said shell normal to said surface; a hollow cylindrical member having a body portion with a smaller outside diameter than the inside diameter of said cylindrical shell and a frusto-conical tip portion, said cylindrical member mounted with said tip portion extending into said heat transfer chamber and in coaxial alignment with said cylindrical shell to form a plenum between the shell and cylindrical member; a plurality of passageways formed through one wall of said hollow cylinder near said tip portion with the longitudinal axes of the passageways inclined toward the interior of the tip portion; and means including a blower mounted to discharge into said plenum, whereby the discharge from said blower communicates through said passageways and converges toward said tip portion.

2. A boiler of the type having a heat transfer chamber; a heat exchanger mounted within said chamber; means applying working fluid to said heat exchanger for conversion of said fluid to a hot pressurized fluid; means to pass hot gas from an external source through said heat transfer chamber for interaction with said heat exchanger; heating means mounted outside said chamber and opening to said heat exchanger; means mounted in said heating means to create a second source of hot gas for flow to said heat exchanger; indicator means sensitive to the temperature of the hot pressurized fluid released from said heat exchanger; valve means controlling the input of said hot gas from the external source into said heat transfer chamber responsive to be controlled by said indicating means inversely in respect to the temperature of the pressurized fluid released from said heat exchanger, regulator means to control said heating means and the second source of hot gas, said regulator means being responsive to be controlled by said indicator means inversely in respect to the temperature of the hot pressurized fluid released by said heat exchanger means operably connected to said valve means operable to deactivate said heating means during operating intervals when said valve means is at other than substantially full open position.

3. In a waste heat recovery unit of the type having a heat transfer chamber, a heat exchanger mounted within said heat transfer chamber, means applying working fluid to said heat exchanger for conversion of said fluid to a hot pressurized fluid, the improvement of an auxiliary firing system comprising, in combination: means to import a waste heat gas from a source thereof into said chamber for interaction with said heat exchanger; indicator means sensitive to the energy level of the pressurized fluid released from said heat exchanger; valve means responsive to be controlled by said indicator means to vary the input of waste heat gas to said heat transfer chamber inversely in respect to the energy level of said pressurized fluid; heating means mounted outside said heat transfer chamber and opening into said heat exchanger; means mounted in said heating means to generate hot gas flow to said heat exchanger in addition to the flow of waste gas therethrough; actuator means responsive to be controlled by said indicator means at and below a predetermined energy level of the pressurized fluid released by said heat exchanger, said actuator means arranged to energize said heating means to generate hot gas for flow to said heat exchanger to raise the energy level of the pressurized fluid and means to deactivate said heating means when the energy level of the pressurized fluid is elevated to said predetermined level by said waste heat gas.

4. The waste heat recovery unit and improvement thereon in accordance with claim 3 and wherein said energy level is pressure.

5. The waste heat recovery unit and improvement thereon in accordance with claim 3 and wherein said energy level is temperature.

6. In a boiler of the type having a heat transfer chamber, a heat exchanger mounted within said chamber, means applying working fluid to said exchanger for conversion of said fluid to a hot pressurized fluid, first and second hot gas passageways opening into said chamber, valve means connected to said first passageway to regulate the amount of gas flow therethrough, a first source of hot gas directed to said first passageway to flow past said valve means, second hot gas generating means connected to said second conduit, said second hot gas generating means having a burner and a supply of pressurized air directed into said second conduit, both said burner and said source of pressurized air being positioned substantially removed from the interior of said chamber, indicator means sensitive to the energy level of pressurized fluid released from said heat exchanger, means to actuate said valve controlled by said indicator means in reciprocal proportion to the energy level of the pressurized fluid released from said heat exchanger, means to regulate the energy output of said second hot gas generating means controlled by said indicator means in reciprocal proportion to the energy level of the pressurized fluid released by said heat exchanger, and means further regulating said second hot gas generating means controlled by the position of said valve means to cause said burner to function in coordination with the hot gas flow into said chamber through said first conduit.

References Cited by the Examiner
UNITED STATES PATENTS

| | | | |
|---|---|---|---|
| 2,502,941 | 4/1950 | Giger et al. | 60—39.07 |
| 2,919,540 | 1/1960 | Percival | 122—7 X |
| 2,926,493 | 3/1960 | Poole et al. | 60—39.07 |

KENNETH W. SPRAGUE, *Primary Examiner.*